United States Patent [19]

Sallwasser et al.

[11] Patent Number: 5,508,514
[45] Date of Patent: Apr. 16, 1996

[54] WELL LOGGING DEVICE WITH A PAD

[76] Inventors: Alan J. Sallwasser, 144, rue d'Aulnay, Appt. 1040, 92290 Chatenay Malabry; Philippe Chevalier, 6, allee du Buisson, 91370 Verrieres-le-Buisson; Kevin E. Eyl, 13, rue Michelet, 92100 Boulogne, all of France

[21] Appl. No.: 316,004

[22] Filed: Sep. 30, 1994

[30] Foreign Application Priority Data

Oct. 6, 1993 [FR] France .................................. 93 11896

[51] Int. Cl.⁶ .................................................. G01V 5/12
[52] U.S. Cl. ........................ 250/266; 250/265; 250/269.2
[58] Field of Search .................................... 250/268, 266, 250/265, 256, 269.3, 269.2, 269.7

[56] References Cited

U.S. PATENT DOCUMENTS

| | | |
|---|---|---|
| 3,564,914 | 2/1971 | Desai et al. . |
| 3,566,682 | 3/1971 | Winkler . |
| 3,608,373 | 9/1971 | Youmans . |
| 3,990,297 | 11/1976 | Pelet et al. . |
| 4,047,027 | 9/1977 | Bateman et al. .......................... 250/266 |
| 4,958,073 | 9/1990 | Becker et al. . |
| 5,036,283 | 7/1991 | Trouiller et al. . |
| 5,198,770 | 3/1993 | Decorps et al. . |

FOREIGN PATENT DOCUMENTS

| | | |
|---|---|---|
| 487424 | 5/1992 | European Pat. Off. . |
| 9304229 | 4/1993 | France . |

*Primary Examiner*—Davis L. Willis
*Assistant Examiner*—Richard Hanig

[57] ABSTRACT

The invention concerns a well logging device with a pad, characterized in that the pad has a nuclear sensor with a gamma ray source and two detectors separated by a space in the longitudinal direction, and a second sensor of different type located in said space, preferably a micro-resistivity sensor with electrodes.

20 Claims, 5 Drawing Sheets

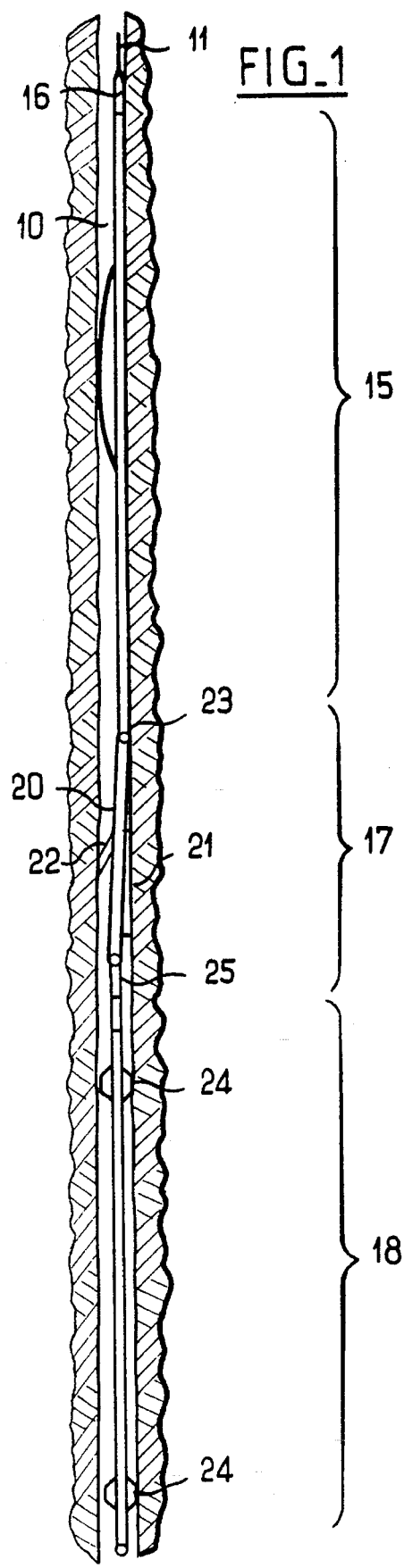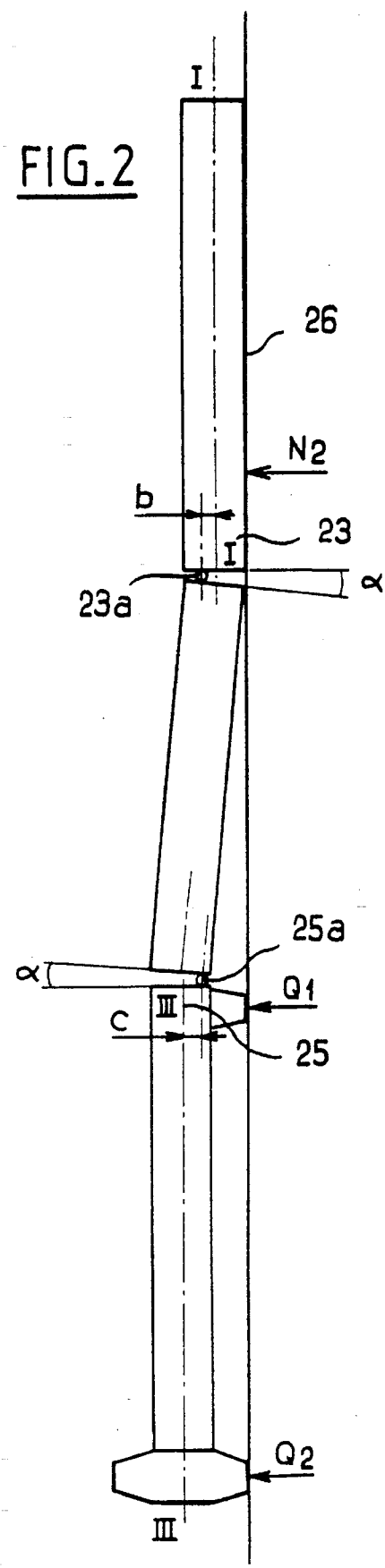

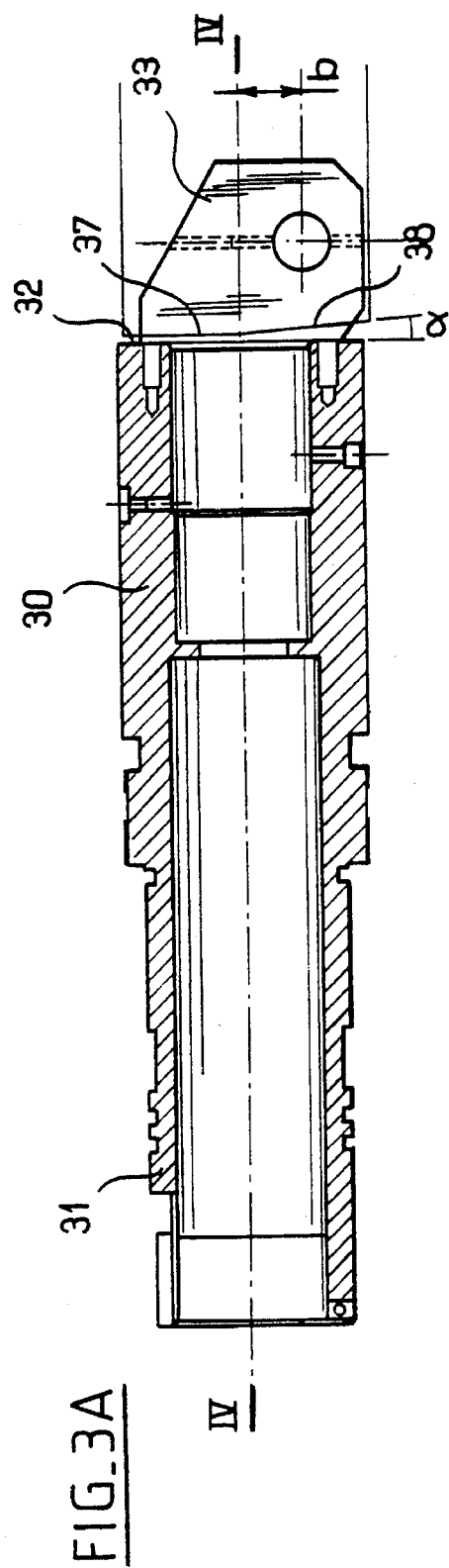
FIG_3A
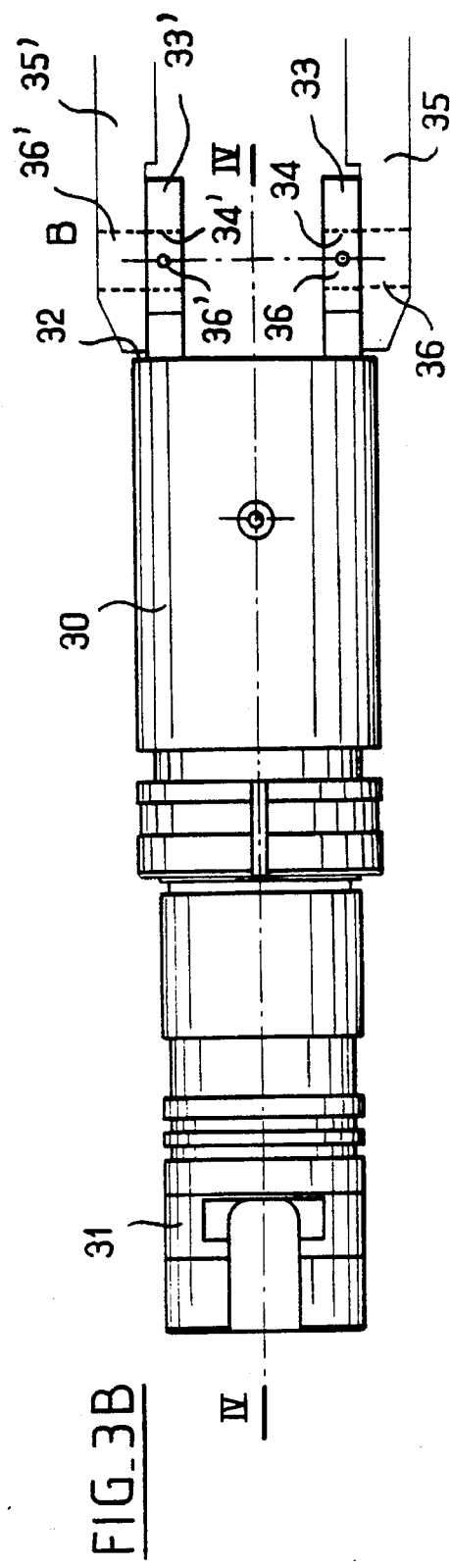
FIG_3B

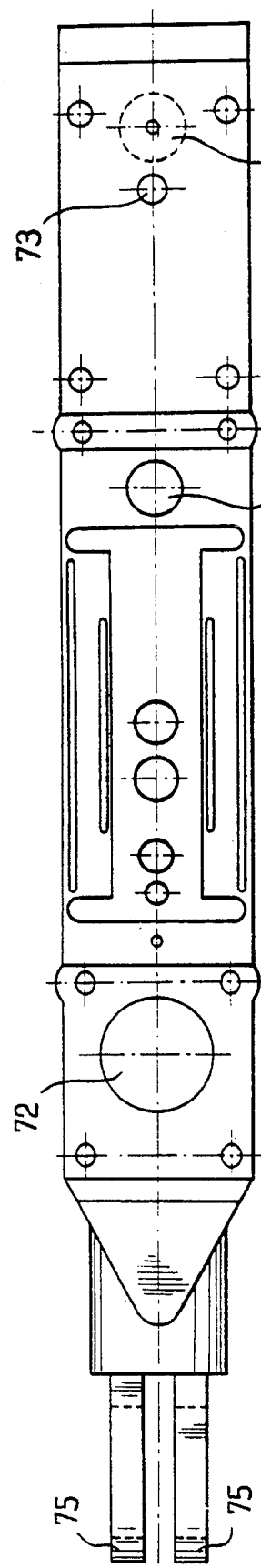
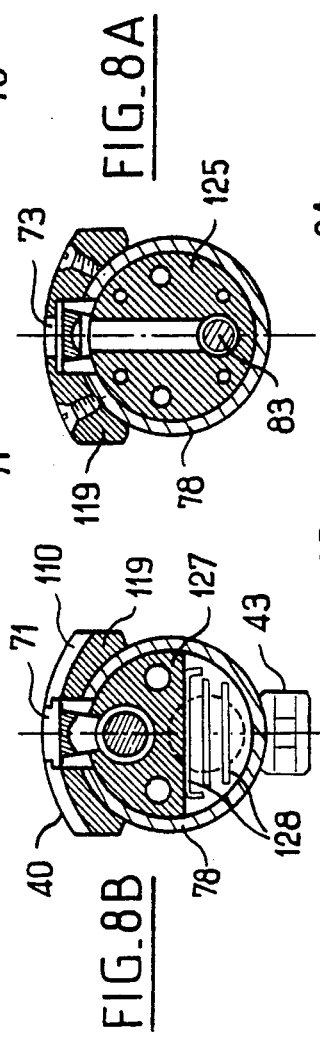
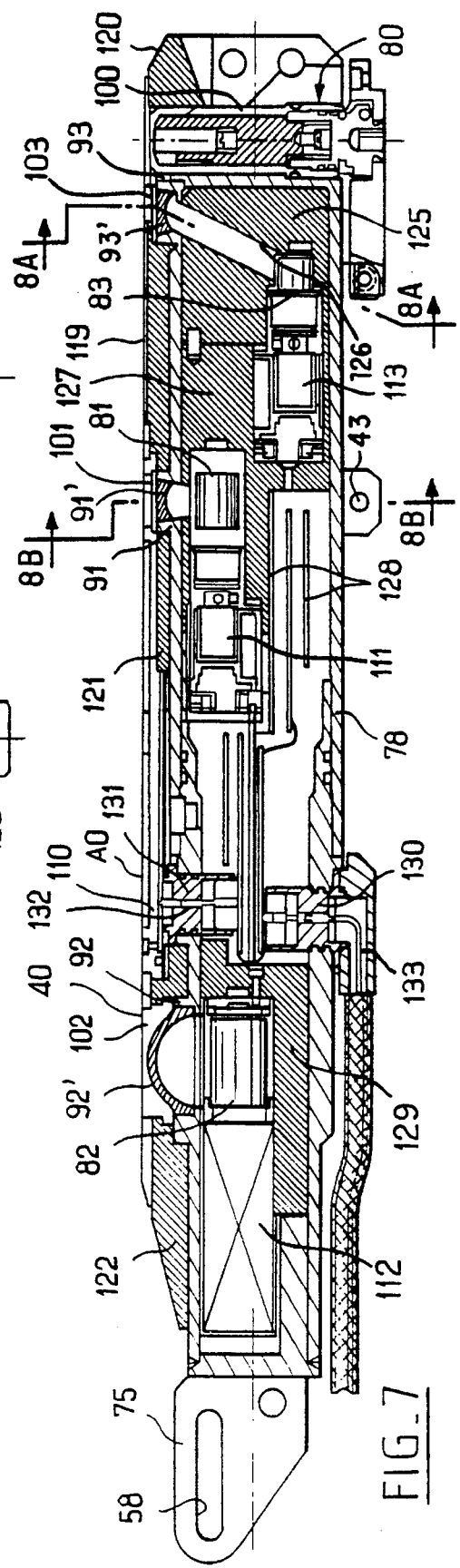

WELL LOGGING DEVICE WITH A PAD

The present invention concerns the study of geological formations traversed by a borehole and more particularly a well logging device comprising a pad adapted to contact the wall of the borehole and carrying sensors.

Such devices comprising two sensors of different types have been proposed. Thus U.S. Pat. No. 3,566,682 describes a device comprising a nuclear sensor mounted in a pad and an electrode sensor mounted at the end of the counter-arm on the side opposite the pad. Designs comprising different sensors located opposite one another are also described in U.S. Pat. Nos. 3,564,914 and 3,608,373. All these proposals suffer from the problem that the measurements do not relate to the same zone of the formation, the sensors being applied to parts diametrically opposed in the wall of the borehole. This results in a risk of error when the measurements provided by the respective sensors are combined.

A well logging device is described in U.S. Pat. No. 5,198,770 comprising a pad which carries several sensors of different types aligned in the longitudinal direction and placed end to end. This arrangement ensures that all the sensors "see" the same zone of the formation. That patent provides a modular configuration in which each of the sensors has members at its ends allowing electrical and mechanical connection to the adjacent sensors when the ends in question are placed in contact.

The aforesaid modular configuration has the advantage of flexibility. However it implies a relatively long pad, which is a problem as it reduces the ability of the pad to remain in contact with the wall of the borehole in spite of irregularities which may exist therein (hollows, etc.). However, good contact of the pad is a condition of satisfactory quality of the measurements.

The invention provides a well logging device with a pad, characterized in that the pad has a nuclear sensor with two detectors separated by a space in the longitudinal direction, and a second sensor of different type located in said space.

An embodiment of the invention is described below with reference to the accompanying drawings, in which:

FIG. 1 is a schematic overview of an entire combination logging device constituting an embodiment of the invention, and formed of three sections;

FIG. 2 shows the geometry of the second section of the device of FIG. 1, and more particularly its joints with the other sections;

FIGS. 3A and 3B are detail views of one embodiment of the above-mentioned joints;

FIG. 6 is view of the contact face of the measuring pad, in an embodiment that includes two types of sensor that are interleaved;

FIG. 7 shows the pad of FIG. 6 in section on the longitudinal plane VII—VII of FIG. 6; and FIGS. 8A and 8B are sections of the pad of FIG. 7 on the lines A—A and B—B respectively.

Figure 4A:
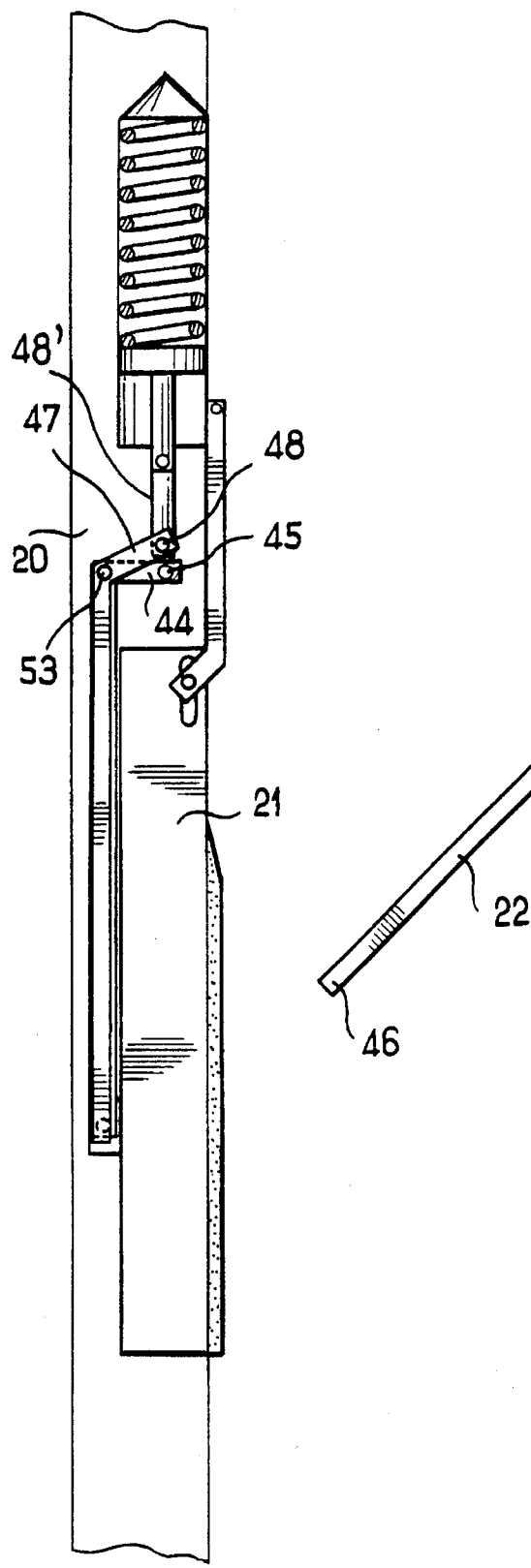
FIGS. 4A and 4B are schematic diagrams showing one embodiment of the coupling mechanism for the second section carrying a pad, respectively in the closed position and in the open position.

The combination well logging device (or "tool string") shown in FIG. 1 is adapted to be lowered inside a borehole 10 by means of a transmission cable 11. The cable is connected in conventional manner to surface apparatus, not shown, comprising in particular a winch and means for recording and processing the measurement data produced by the logging device and transmitted through the cable.

The device comprises three sections mounted end to end: a first section 15 forming the upper part of the device, connected by a coupling 16 to the cable 11; a second section 17 suspended from the first section 15 and forming an intermediate part; and a third section 18 suspended from the second section and forming the lower part of the device.

The first section is provided with a resilient member 19 in the form of a bow, which bears against the wall of the borehole in its middle part and exerts a force on the first section 15, pressing it against the wall, along a generatrix diametrically opposite the member 19. Such an arrangement is conventional in the case of a neutron logging sonde, which must necessarily be pressed against the wall, in particular in the region of the neutron source, in order to provide correct measurements.

In addition to a neutron logging sonde such as a CNT tool of Schlumberger, the first section may suitably include a sonde for measuring natural gamma radioactivity and a telemetry cartridge forming the interface between the elements of the device and the cable. An inclinometer sonde, such as the GPIT tool of Schlumberger, which comprises accelerometers and magnetometers for all three axes may also be suitably included in this section.

The second section 17 comprises a body forming a cradle 20 carrying a measuring pad 21 adapted to be pressed against the wall, and a counter-arm 22 on the side opposite the pad 21. The measuring pad typically comprises a gamma-gamma device providing a measure of formation density. It can also, as described above, comprise a "micro-resistivity" device providing a measurement of the resistivity in the rear zone of the wall of the borehole, called the invaded zone.

The second section is connected to the first section 15 by a hinge 23 which allows the second section 17 to be inclined relative to the first section 15. More particularly, in the embodiment shown in FIG. 1 and more clearly in FIG. 2, the second section can pivot relative to the first section about an axis perpendicular to the axis of the first section, in a longitudinal plane containing the abovementioned contact generatrix. This pivoting is allowed solely away from said generatrix. It should also be stressed that the hinge 23 does not allow any twisting between the second section and the first section. The angular orientation of the body 20 is preferably such that the median longitudinal plane of the pad 21 is aligned with the abovementioned contact generatrix, as shown in FIG. 1.

It is to be noted that the electronics cartridge containing the processing circuits associated with the sensors in the pad 21 can be located in the first section 15, rather than being attached to the body 20 in the second section 17. Such a design has the advantage of reducing the length and the weight of the second section.

The third section 18 comprises one or more spacers 24 (called stand-offs) which keep it spaced from the wall of the borehole. The third section comprises a sonde for measuring resistivity, which can be an electrode sonde of Laterolog type (DLT or ARI tool of Schlumberger), or a sonde with induction coils (DIT or AIT tool of Schlumberger).

The third section is connected to the second section 17 by a hinge 25 allowing these sections to be inclined relative to each other. In the described embodiment, this is a hinge of the same type as the hinge 23, which provides one degree of freedom between the second and third sections. The hinge 25 is so located that it allows pivoting in the same plane as the longitudinal plane defined above for the hinge 23. However, as shown in FIG. 1, the pivoting is allowed only towards the abovementioned generatrix—that is to say towards the pad 21—even though the pivoting is allowed away from the said generatrix in the case of the hinge 23. Moreover, as in the case of the coupling between the first and second sections, the third section cannot twist relative to the second section.

FIG. 2 shows the hinges 23 and 25, symbolized by respective pivots 23a and 25a, with the pivotal angles exaggerated compared with reality.

It is noted that the hinge 23 between the first and second sections has an axis that is offset from the axis I—I of the first section by a distance b, the said axis being located on the side opposite to the contact generatrix 26 of the first section. The maximum pivotal angle allowed by the hinge 23 is an angle α. A suitable value for this angle is around 2°.

The hinge 25 has its axis offset relative to the axis III—III of the third section by a distance c, the said axis being located on the same side as the contact generatrix 26 and accordingly on the side opposite to the pivotal axis of the hinge 23. As in this latter case, the desired maximum pivotal angle is around 2°.

The distances b and c are chosen to minimize the risk of loss of contact between the first section and wall of the borehole under the action of the weight of the assembly formed by the second and third sections. For this purpose it is arranged that the center of gravity of the assembly formed by the second and third sections to be no further from the wall than the pivot 23a, or to be closer. Thus, in the embodiment shown, the distance b is selected to be of the same order as the distance c. Typical values are for example a distance b of 22 mm and a distance c of 22 mm.

FIGS. 3A and 3B show one possible implementation of the hinges 23, 25. If the case of the hinge 23 is considered, this comprises a tubular part 30 with an axis IV—IV, comprising an end part 31 adapted to be fixed to the adjacent section, in this case the first section 15. The part 30 has an annular transverse face 32 at the end opposite the part 31 and two parallel, longitudinal clevis plates 33, 33' extending from the face 32. These plates have respective holes 34, 34' with the same transverse axis B, which axis is spaced from the axis IV—IV by a distance b in accordance with the preceding remarks. The part of the hinge which is connected to the second section 17 comprises two clevis plates 35, 35' associated with the plates 33, 33' respectively and provided with respective pivots 36, 36' engaged in the holes 34, 34'. The plates 35, 35' are shown in FIG. 3B as being located outside the plates 33, 33', but they could equally be located between the plates 33, 33'. Each of the plates 35, 35' has an end surface with two facets which cooperate with the end face 32 of the tubular part 30 in order to allow the limited pivoting, and that solely in one sense, of the second section 17 relative to the first section 15. This surface thus comprises a transverse facet 37 which is accordingly parallel to the end face 32, and an oblique facet 38 meeting the transverse facet at an edge which intersects the axis IV—IV. The oblique facet 38 is located on the side of the pivots 36, as FIG. 3A shows. The angle between the oblique facet and the transverse facet corresponds to the pivotal angle α mentioned above. Moreover, although the transverse facet 37 has been shown for the sake of clarity spaced from the face 32, it should be noted that the transverse facet abuts the face 32, thus preventing any pivoting of the plates 35, 35' in counterclockwise sense (in FIG. 3A). The plates 35, 35' can only pivot clockwise until the oblique facet 38 comes into abutment with the end face 32.

One implementation of the coupling mechanism of the second section 17 including a measuring pad 21 is now described with reference to the schematic views of FIGS. 4A and 4B.

The face of the pad 21 for contacting the wall of the borehole is referenced 40. The pad 21 is supported by an arm 41, one end of which is connected to the rear face 42 of the pad by a hinge 43, which allows pivoting between the pad and the arm 41. The arm 41 is extended at its end remote from the hinge 43 by a bent part or crank 44, whose end is connected to the body 20 by a fixed pivot 45. The counter-arm 22, whose outer end 46 is adapted to contact the wall of the borehole on the side opposite the pad 21, is similarly extended by a bent part or crank 47, whose end is connected by a pivot 48 to the end of a connecting rod 48' pivoted to the end of the rod 49 of a piston 50. This piston is mounted in a cylinder 51 fixed to the body 20 and can be displaced by application of hydraulic pressure overcoming the action of a spring 52, which acts on the pivot 48 in the sense opening out the counter-arm 22. The arm 41 and the counter-arm 22 are connected by a floating pivot 53 located at their junctions with the crank 44 and the crank 47 respectively but not connected to the body 20. This arrangement has the effect that, when the counter-arm 22 comes into contact with the wall of the borehole under the action of the spring 52, as in the position of FIG. 4B, the arm 41 pivots until the pad 21 contacts the wall of the borehole. The piston 50 is actuated to restore the mechanism to the closed position shown in FIG. 4A.

Figure 4B:
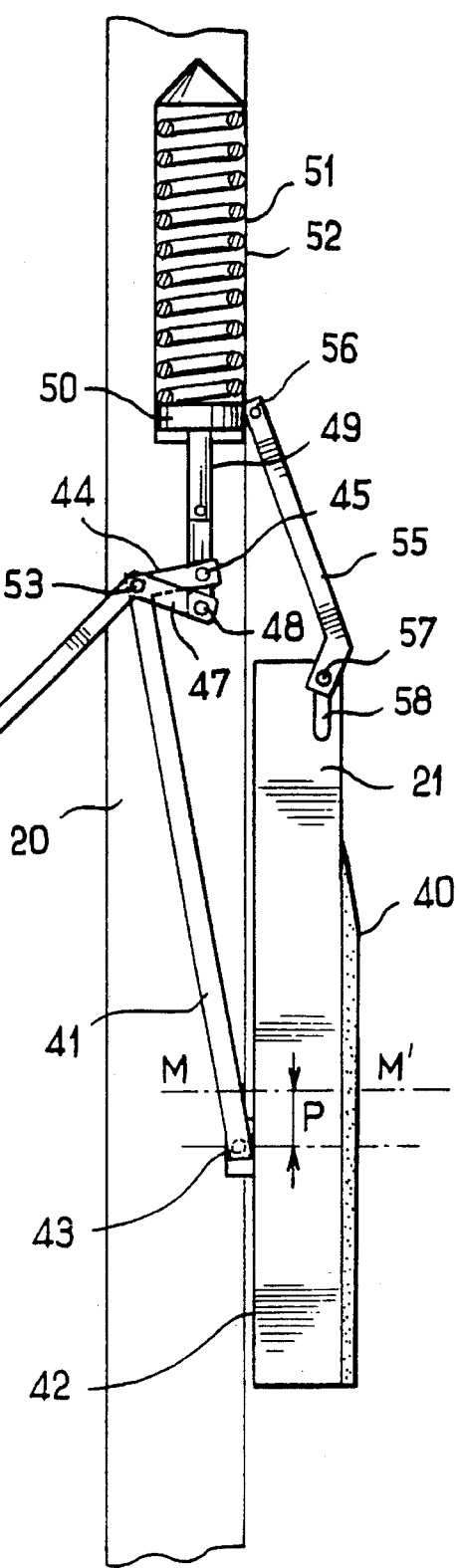

The embodiment shown in FIGS. 4A and 4B also comprises an upper link 55 having its upper end connected to the body 20 by a pivot 56 and having a pivot pin 57 at its lower end engaging in a slot 58 formed in the upper part of the pad 21. The link 55 acts to limit the inclination which the pad 21 can assume relative to the axis of the body 20 but, with the play of the pivot pin 57 along the slot 58, does not exert any significant pull on the pad 21 during the displacement of the body. A similar arrangement, comprising a lower link, can be provided in a symmetrical manner at the lower part of the pad.

It is to be noted that, in this implementation, the pad 21 is supported by the single arm 41 and, as a result, the whole of the force exerted on the pad 21 to move it along the wall of the borehole is transmitted by the pivot 43. This results in particular in the force being applied without giving rise to a couple tending to tilt the pad. As shown in FIGS. 4A and 4B, the pivot 43 is preferably located in the central part of the pad 21 (considered in the longitudinal direction), near to the central plane M-M' of the pad transverse to the axis of the body. The location considered the most advantageous for the pivot 43 is in the lower half of the pad, slightly below the central plane M-M', as is shown in FIGS. 4A and 4B. More specifically, the distance p between the pivot 43 and the central plane M-M' preferably lies between 0% and 15% of the length of the part 40 of the pad which is adapted to make contact with the wall. With such a design, the reaction force of the wall of the borehole on the pad acts in the central zone of the pad, as is desirable for optimum application of the pad against the wall.

Figure 5B:
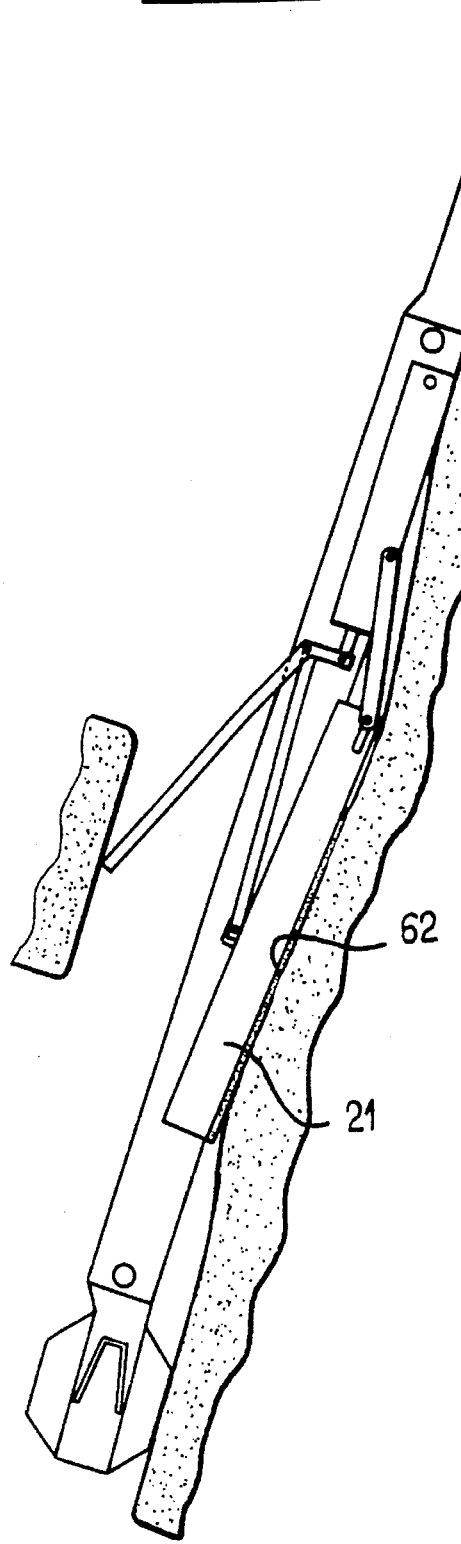
FIGS. 5A and 5B illustrate the behavior of the coupling mechanism of FIGS. 4A and 4B under different operating conditions.
Figure 5A:
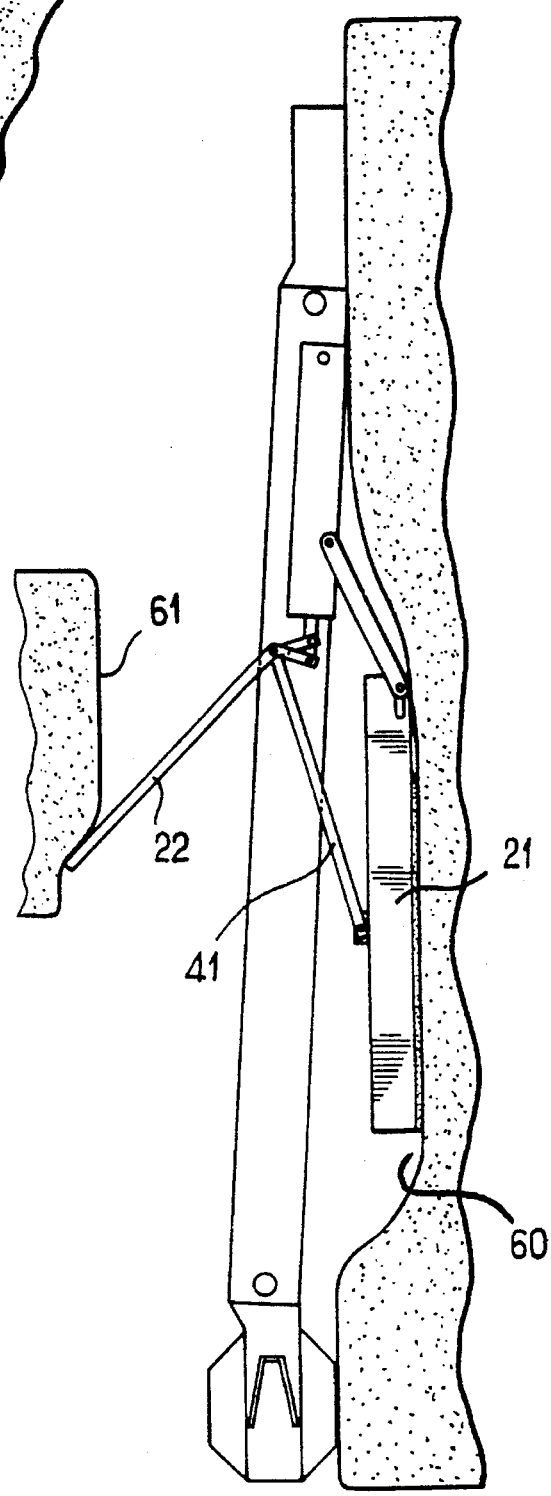

The described implementation ensures satisfactory contact of the pad 21 with the wall of the borehole under diverse working conditions illustrated in FIGS. 5A and 5B.

FIG. 5A illustrates the simultaneous presence of a "hollow" 60, consisting of a cavity formed in the wall of the borehole beside the pad 21, and of a projection or cornice 61 on the opposite side of the wall. FIG. 5A shows that the coupling mechanism described above is able to absorb such abrupt variations in the diameter of the borehole: the respective angular divergences of the counter-arm 22 and of the arm 41 relative to the axis of the body can vary significantly without affecting the force applied to the pad 21 by the arm 41 and, on the other hand, the arrangement of arms connected to the pad 21, namely the arm 41 and the link 55 in the illustrated embodiment, allows the pad 21 to rest against the wall, despite the presence of a hollow, in an optimum manner given the longitudinal dimension of the pad.

FIG. 5B shows an inclined borehole with a ramp 62. The pad 21 is capable of remaining in contact with the wall along this ramp because of the inclination which it can assume relative to the body of the sonde. Equally, the mounting of the body 20 between two hinges, as described above, is a favorable factor which avoids the pad becoming "caked" against the wall by the body 20.

It should be noted that the pivotal connection between the arm 41 and the pad 21 can be implemented in a different way from that described above. Thus a connection could be provided between two lateral pivots located on one side and the other of the pad 21, engaging in a fork extending the arm 41.

A preferred embodiment of the pad 41 will now be described with reference to FIGS. 6, 7 and 8A–8B. As indicated above, it is arranged to combine in a single pad both gamma-gamma transducers or sensors providing a measure of the density of the formations and transducers of different type providing a measure with high vertical resolution of another magnitude, preferably resistivity, in the zone adjoining the wall of the borehole. This combination is realized as shown in FIG. 6 by interleaving members of different types: the gamma-gamma sensors comprise a source of gamma rays and at least one near detector and one far detector, represented in FIG. 6 by the windows 70, 71 and 72 associated with these components respectively; the electrodes A0, A1, M, etc., which make up the device for measuring resistivity are interleaved in the space between the window of the near detector 71 and that of the far detector 72. This design minimizes the length of the contact part 40 of the pad, which is advantageous for good application of the pad against the wall and is equally favorable from the point of view of combining the density measurements with the micro-resistivity measurements respectively provided by these sensors, since errors in the depths attributed to the measurements arising in particular from variations in the instantaneous speed of the pad, are avoided in large measure.

In the embodiment shown in the figures, the gamma-gamma device comprises, apart from the near and far detectors, a backscatter detector located in the immediate vicinity of the source, in accordance with the teaching of U.S. Pat. No. 4,958,073. This detector is characterized by a non-negative response to an increase in the density of the formation, in contrast with the near and far detectors which are attenuation detectors and exhibit a negative response to an increase in the density. The window associated with the backscatter detector is shown at 73 in FIG. 6.

As to the design of the electrodes of the micro-resistivity sensor, this is generally in conformity with the teaching of U.S. Pat. No. 5,036,283, especially FIG. 5 of this patent, or of U.S. Pat. No. 5,198,770 and reference is made to these documents for more information. The design of the electrodes shown comprises firstly a generally I-shaped guard electrode A0 providing passive focusing, and an active focusing system comprising focusing electrodes A1 located on either side of the electrode A0 relative to the longitudinal direction of the pad, and control electrodes M located between the guard electrode A0 and the focusing electrodes A1. The illustrated design also comprises a measuring electrode in the form of a button B0 fitted within the central electrode A0, being insulated therefrom, being centered in its median plane, and being sensitive to the resistivity Rxo of the invaded zone, together with two buttons B1, B2 aligned with the button B0 and of smaller diameter, which provide a measure of resistivity with a smaller depth of investigation, of the type known as Microlog. In addition a button B3 identical with the button B0 is provided in alignment therewith in the longitudinal direction. The buttons B0 and B3, being aligned in the longitudinal direction (i.e. in the direction of movement of the pad) provide two measurements from the same zone of the formation at offset instants, which makes it possible to determine the speed of movement of the pad by correlation. The resulting information is used to determine a depth correction. It is advantageously combined with an indication of the speed obtained from acceleration measurements provided by the above-mentioned inclinometer sonde of the first section, in order to improve the accuracy of the correction, in accordance with a method described in detail in French patent application 93 04229 filed 9th Apr. 1993.

Referring more particularly to FIGS. 8A, 8B, note firstly the face 40 adapted to contact the wall of the borehole and having to this end the shape of a sector of a cylinder. On the opposite side is seen the pivot 43 for making the connection to the support arm, such as the arm 41 shown in FIG. 4B. At its upper end, the pad is extended by two clevis plates 75, each with a slot referenced 58 as in FIG. 4B, for the connection with a link such as the link 55 shown in FIG. 4B.

As its main structural part, the pad comprises a pressure-resistant casing 78 of generally cylindrical shape, made of stainless steel for example. Inside the casing 78 are disposed gamma ray detectors 81, 82, 83, the detectors 81 and 82 "near" and "far" attenuation detectors respectively and the detector 83 being a backscatter detector. In order to allow the gamma rays to reach the detectors, the casing 78 has openings provided with collars 91, 92, 93 on which rest respective domed parts 91', 92', 93' made of a pressure-resistant material with low gamma ray absorption, such as beryllium or titanium. Protective parts 101, 102, 103 of synthetic material of the PEEK type for example are fixed on the domes 91', 92', 93' respectively, these parts forming the windows 71, 72, 73 shown in FIG. 6.

The detectors are appropriately photo-scintillators of GSO type (gadolinium orthosilicate) or NaI. Assemblies 111, 112, 113 respectively are associated with the detectors 81, 82, 83, each being composed of a photo-multiplier, a high voltage supply with its control circuit and a preamplifier circuit.

The gamma ray source, typically a caesium 137 source is a unit 80 located at the lower end of the pad on the outside of the casing 78 and which has its own pressure-resistant envelope 100.

The electrodes A0, M, A1 which form the micro-resistivity sensor are metal parts located in respective recesses formed in a sector of a collar 110 of insulating material, for example PEEK. The detectors 81–83 are screened from unwanted gamma rays (i.e. those which have not interacted with the formation), in particular from direct arrivals, by shields with high gamma ray absorbing power, for example made of material such as tungsten or depleted uranium.

Thus, one shield member 119 with the shape of a sector of a collar is shown in FIGS. 8A, 8B covering the casing 78 in the lower part of the pad, the member 119 having openings which form the windows 70 (for the source), 71 (near detector) and 73 (backscatter detector). This member has an end part 120 which beyond the source 80, thus forming the lower end of the pad, in such a way as to minimize the gamma ray flux towards the borehole fluid. At the opposite end the member 119 is continued by a part 121 extending well beyond the window 71 of the near detector 81, the part 121 being located between the casing 78 and the inside of the sector 110 of insulating material. This arrangement of the shield member minimizes the risk of gamma rays escaping through the insulating material, which has a low absorption to gamma rays. In like manner, a shield member 122 is located on the outside of the casing 78 in the region of the far detector 82 and has an opening forming the window 72.

Shield members of generally cylindrical shape are also provided on the inside of the casing 78. A first inner member 125 surrounds the backscatter detector 83. The member 125 has an oblique hole 126 which ensures collimation of the gamma rays towards the detector 83. A second inner member 127 is fixed to the member 125 and surrounds the near detector 81. The member 127 has the shape of a half-cylinder, as FIG. 7 shows, in its upper part, leaving the lower part of the space inside the casing 78 free, which can thus receive circuit boards or electronics components 128. In like manner, an inner shield member 129 surrounds the far detector 82.

It is also noted that the casing 78 has openings receiving sealed feed-throughs 130, 131 to provide passage for conductors, such as conductors 132 which connect the electrodes (A0, etc.) to circuit boards or components located inside the casing 78 and conductors 133 which connect the boards or associated components to the gamma detectors or to the electrodes on the body of the sonde.

We claim:

1. A well logging device including a pad, comprising:
   a) a gamma ray source;
   b) a first sensor comprising two nuclear detectors spaced apart in a longitudinal direction of the pad for detecting a first formation parameter; and
   c) a second, non-nuclear sensor located between the two nuclear detectors for measuring a second formation parameter.

2. A well logging device as claimed in claim 1, wherein the nuclear detectors are gamma ray attenuation detectors.

3. A well logging device as claimed in claim 2, wherein the first sensor further comprises a backscatter detector located near to the source.

4. A well logging device as claimed in claim 1, wherein the second sensor is a microresistivity sensor with electrodes.

5. A well logging device as claimed in claim 4, wherein the pad has a pressure-resistant casing which receives the nuclear detectors and has windows transparent to gamma rays associated with the nuclear detectors respectively, first shielding members being located inside the casing and surrounding each of the detectors and second shield members opaque to gamma rays located on the outside of the casing around the windows.

6. A well logging device as claimed in claim 5, wherein the electrodes are fitted in recesses formed in a layer of insulating material spaced from the outer surface of the casing, the space between the layer of insulating material and the casing having received therein a further shield member comprising an extension of the second shield member.

7. A well logging device for use in a borehole, comprising:
   a) a tool body;
   b) a pad moveably mounted on the tool body so as to be extendible in a radial direction for contacting a wall of the borehole;
   c) a gamma ray source located in the pad;
   d) a first sensor comprising two nuclear detectors spaced apart in a longitudinal direction of the pad for detecting a first formation parameter; and
   e) a second, non-nuclear sensor located between the two nuclear detectors for measuring a second formation parameter.

8. A well logging device as claimed in claim 7, wherein the tool body comprises first, second and third body parts, the first and second body parts and the second and third body parts being connected respectively by means of articulated joints so as to be relatively moveable.

9. A well logging device as claimed in claim 8, wherein the pad is mounted on the second body part.

10. A well logging device as claimed in claim 7, further comprising a counter arm moveably mounted on the tool body so as to be extendible in a radial direction for contacting the wall of the borehole opposite to the pad.

11. A well logging device as claimed in claim 7, wherein the first formation parameter detected by the first sensor is indicative of formation density and the second formation parameter detected by the second sensor is indicative of formation resitivity.

12. A well logging device as claimed in claim 10, wherein the pad and the counter-arm are interconnected so as to move together to accomodate variations in borehole diameter.

13. A well logging device for use in a borehole, comprising:
   a) a tool body comprising first, second and third body parts;
   b) at least one sensor in the first body part for measuring a first parameter;
   c) a pad moveably mounted on the second body part so as to be extendible in a radial direction for contacting a wall of the borehole;
   d) a gamma ray source located in the pad;
   e) a first pad sensor comprising two nuclear detectors spaced apart in a longitudinal direction of the pad for detecting a second parameter;
   f) a second, non-nuclear, pad sensor located between the two nuclear detectors for measuring a third parameter; and
   g) at least one sensor in the third body part for measuring a fourth parameter.

14. A well logging device as claimed in claim 13, wherein the first and second body parts and the second and third body parts are connected respectively by means of articulated joints so as to be relatively moveable.

15. A well logging device as claimed in claim 13, wherein the at least one sensor in the first body part is selected from the group consisting of neutron detectors, gamma ray detectors, accelerometers and magnetometers.

16. A well logging device as claimed in claim 13, wherein the second parameter is indcative of formation density and the third parameter is indicative of formation resistivity.

17. A well logging device as claimed in claim 13, wherein the fourth parameter is indicative of formation resistivity.

18. A well logging device as claimed in claim 13, wherein the nuclear detectors are gamma ray attenuation detectors.

19. A well logging device as claimed in claim 18, wherein the first pad sensor further comprises a backscatter detector located near to the source.

20. A well logging device as claimed in claim 18, wherein the second pad sensor is a microresistivity sensor with electrodes.

* * * * *